(12) United States Patent
Lee et al.

(10) Patent No.: US 10,461,793 B2
(45) Date of Patent: Oct. 29, 2019

(54) COVER OF A MOBILE DEVICE AND MOBILE DEVICE INCLUDING THE SAME

(71) Applicant: Samsung Electronics Co., Ltd., Suwon-si, Gyeonggi-do (KR)

(72) Inventors: Young-Ki Lee, Incheon (KR); Hyoung-Hwan Roh, Seoul (KR); Il-Jong Song, Suwon-si (KR); Yo-Han Jang, Seoul (KR); Byeong-Hoon Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 109 days.

(21) Appl. No.: 15/372,811

(22) Filed: Dec. 8, 2016

(65) Prior Publication Data

US 2017/0093455 A1    Mar. 30, 2017

Related U.S. Application Data

(63) Continuation of application No. 14/322,386, filed on Jul. 2, 2014, now abandoned.

(60) Provisional application No. 61/842,546, filed on Jul. 3, 2013.

(30) Foreign Application Priority Data

Jan. 29, 2014    (KR) .......................... 10-2014-0011470

(51) Int. Cl.
| | | |
|---|---|---|
| *H01Q 1/24* | (2006.01) | |
| *H04B 1/3888* | (2015.01) | |
| *H01Q 13/10* | (2006.01) | |
| *H04B 5/00* | (2006.01) | |
| *H04M 1/725* | (2006.01) | |

(52) U.S. Cl.
CPC ........... *H04B 1/3888* (2013.01); *H01Q 1/243* (2013.01); *H01Q 13/10* (2013.01); *H04B 5/0031* (2013.01); *H04M 1/72575* (2013.01); *H04M 2250/04* (2013.01)

(58) Field of Classification Search
CPC ...... H01Q 1/243; H01Q 13/10; H04B 1/3888; H04B 5/0031; H04M 1/72575; H04M 2250/04
See application file for complete search history.

(56) References Cited

U.S. PATENT DOCUMENTS

| | | | |
|---|---|---|---|
| 2,507,528 A | 5/1950 | Kandoian | |
| 3,172,112 A | 3/1965 | Seeley | |
| 4,063,246 A | 12/1977 | Greiser | |
| 4,245,222 A | 1/1981 | Eng et al. | |
| 6,346,914 B1 | 2/2002 | Annamaa | |
| 7,295,165 B2 | 11/2007 | Ferguson et al. | |
| 7,994,986 B2 | 8/2011 | Desclos et al. | |
| 8,590,797 B2 | 11/2013 | Kato et al. | |

(Continued)

FOREIGN PATENT DOCUMENTS

| | | |
|---|---|---|
| JP | 2011066627 A | 3/2011 |
| JP | 4927781 B2 | 5/2012 |

(Continued)

*Primary Examiner* — Hoang V Nguyen
*Assistant Examiner* — Awat M Salih
(74) *Attorney, Agent, or Firm* — Harness, Dickey & Pierce, P.L.C.

(57) ABSTRACT

A cover of a mobile device includes a metal structure disposed to cover one surface of the mobile device. The metal structure includes a metal material, and operates as an antenna for a wireless communication of the mobile device.

18 Claims, 9 Drawing Sheets

(56) References Cited

U.S. PATENT DOCUMENTS

| | | |
|---|---|---|
| 9,153,856 B2 | 10/2015 | Rappoport et al. |
| 2009/0312054 A1 | 12/2009 | Choi |
| 2009/0315798 A1 | 12/2009 | Nam et al. |
| 2011/0227799 A1 | 9/2011 | Hashimoto |
| 2012/0282857 A1 | 11/2012 | Zhang |
| 2012/0306714 A1 | 12/2012 | Yosui et al. |
| 2012/0326936 A1 | 12/2012 | Tu |
| 2012/0329531 A1 | 12/2012 | Park et al. |
| 2013/0009826 A1 | 1/2013 | Wu |
| 2013/0078917 A1 | 3/2013 | Cho et al. |
| 2013/0207852 A1 | 8/2013 | Nakano |
| 2013/0257659 A1 | 10/2013 | Darnell et al. |
| 2013/0307746 A1 | 11/2013 | Nakano et al. |
| 2014/0042226 A1 | 2/2014 | Lee |

FOREIGN PATENT DOCUMENTS

| | | |
|---|---|---|
| JP | 2013070369 A | 4/2013 |
| KR | 20120103300 A | 9/2012 |
| KR | 101198940 B1 | 11/2012 |

COVER OF A MOBILE DEVICE AND MOBILE DEVICE INCLUDING THE SAME

CROSS-REFERENCE TO RELATED APPLICATIONS

This application claims priority under 35 U.S.C. § 120 as a continuation application of U.S. application Ser. No. 14/322,386, filed Jul. 2, 2014 with the United States Patent and Trademark Office (USPTO), which claims the benefit of priority under 35 U.S.C. § 119 to U.S. Provisional Application No. 61/842,546 filed on Jul. 3, 2013 in the USPTO, and Korean Patent Application No. 10-2014-0011470 filed on Jan. 29, 2014 in the Korean Intellectual Property Office (KIPO), the entire contents of which are incorporated by reference herein in their entireties.

BACKGROUND

1. Technical Field

Example embodiments relate generally to electronic devices and, more particularly, to mobile devices and/or covers of the mobile devices.

2. Description of the Related Art

To perform a desired (or alternatively, predetermined) wireless communication (e.g., a near field communication (NFC), a radio frequency identification (RFID) communication, etc.) in a mobile device, such as a smart phone, or a tablet computer), a wireless communication chip (e.g., an NFC chip) is embedded in the mobile device, and an antenna for transmitting/receiving a signal from/to the wireless communication chip is attached to an inside of a housing of the mobile device (e.g., an inside of a cover of the mobile device). The housing can be formed of resin or plastic.

Recently, as the mobile device has become thinner, the strength of the resin housing has been reduced. Thus, a mobile device housing made of a metal material has been developed to compensate the reduction in strength. However, in the case where the mobile device housing (e.g., the cover of the mobile device) is made of the metal material, the antenna attached to the cover is shielded by the metal material, which hinders the wireless communication of the mobile device.

SUMMARY

Some example embodiments provide a cover of a mobile device, the cover enabling a wireless communication of the mobile device.

Some example embodiments provide a mobile device including a cover that improves wireless communication capabilities of the mobile device.

According to example embodiments, a cover of a mobile device may include a metal structure configured to cover one surface of the mobile device. The metal structure may include a metal material, and operate as an antenna for a wireless communication of the mobile device.

In some example embodiments, the metal structure may include a metal plate region having a shape of a split ring resonator (SPR).

In some example embodiments, the metal structure may include a metal plate including the metal material, the metal plate configured to cover the one surface of the mobile device, an opening formed at the metal plate, a slit extending from the opening, the slit having a width narrower than a width of the opening, and two terminals disposed on the metal plate such that the slit is located between the two terminals.

In some example embodiments, a signal path from one of the two terminals to the other of the two terminals may be formed at a region of the metal plate surrounding the opening.

In some example embodiments, the metal structure may further include an insulator around at least a portion of (e.g., surrounding) the region of the metal plate at which the signal path is formed.

In some example embodiments, the opening may have a triangular shape, a rectangular shape, a polygonal shape having five or more sides, a circular shape or an elliptical shape.

In some example embodiments, the metal structure may further include a capacitor formed at the slit.

In some example embodiments, the metal structure may operate as a resonator having a resonance frequency suitable for the wireless communication.

In some example embodiments, the capacitor may be formed by portions of the metal plate at both sides of the slit and an insulator formed to fill the slit.

In some example embodiments, the two terminals may be coupled to a capacitor included in a matching circuit of the mobile device, and the metal structure and the capacitor included in the matching circuit may operate as a resonator having a resonance frequency suitable for the wireless communication.

In some example embodiments, the metal structure may further include a magnetic sheet disposed on at least a portion of the metal plate.

In some example embodiments, the metal structure may include a metal plate including the metal material, the metal plate configured to cover the one surface of the mobile device, an opening formed at the metal plate, and two terminals disposed on the metal plate such that the opening is located between the two terminals.

In some example embodiments, the metal structure may include a metal plate including the metal material, the metal plate configured to cover the one surface of the mobile device, a first opening formed at the metal plate, a second opening formed at the metal plate, the second opening being spaced apart from the first opening, and two terminals disposed on the metal plate such that the first and second openings are located between the two terminals.

In some example embodiments, the metal structure may operate as the antenna for a near field communication (NFC).

According to example embodiments, a mobile device may include a wireless communication chip, a matching circuit, and a cover of the mobile device. The wireless communication chip may be configured to perform a wireless communication. The matching circuit may be coupled to the wireless communication chip, and configured to perform impedance matching between the wireless communication chip and an antenna for the wireless communication. The cover of the mobile device may be configured to cover at least one surface of the mobile device, and be coupled to the matching circuit. The cover may include a metal material, and be configured to operate as the antenna for the wireless communication.

According to example embodiments, a cover of a mobile device, may include a cover configured to cover at least one surface of the mobile device and operate as an antenna for a wireless communication of the mobile device, the cover formed of a metal material and including a metal plate region, the metal plate region including an opening, at least one slit and at least two terminals, the slit extending from a side of the opening, and the two terminals configured to be connected to a matching circuit of the mobile device.

In some example embodiments, the cover may further include a magnetic sheet covering at least a portion of the metal plate region.

In some example embodiments, the cover may further include an insulator at the slit. The insulator and the two terminals may form a capacitor, and the capacitor and the metal plate region serving as an inductor may be configured to operate as a resonator having an LC resonance frequency.

In some example embodiments, an insulator may be disposed around at least a portion of the metal plate region and be configured to shield a signal path formed at the metal plate from a noise from an outside of the signal path.

In some example embodiments, the cover may further include an insulator at the slit and around at least a portion of the metal plate region, a first portion of the insulator at the slit and the two terminals forming a capacitor, a second portion of the insulator configured to shield a signal path formed at the metal plate from a noise from an outside of the signal path.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
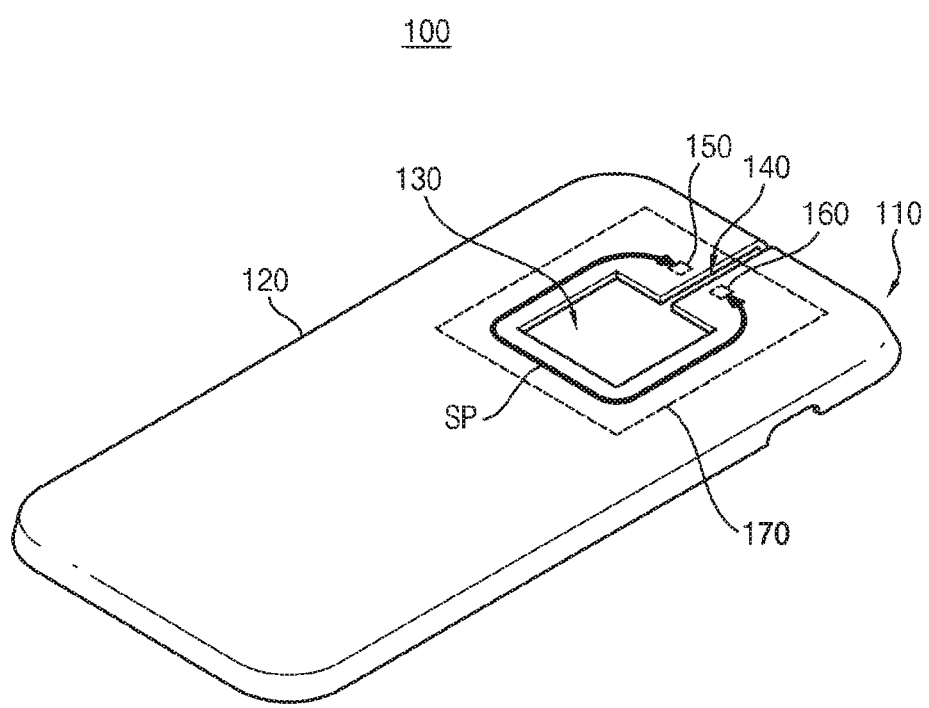
FIG. 1 is a diagram illustrating a cover of a mobile device according to example embodiments.

Various example embodiments will be described more fully hereinafter with reference to the accompanying drawings, in which some example embodiments are shown. Example embodiments may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Hereinafter, some example embodiments will be explained in further detail with reference to the accompanying drawings.

FIG. 1 is a diagram illustrating a cover of a mobile device according to example embodiments.

Referring to FIG. 1, a cover 100 of a mobile device may include a metal structure 110 formed of a metal material. According to example embodiments, the cover 100 of the mobile device may be a cover of any mobile device, for example, a cellular phone, a smart phone, a tablet computer, a laptop computer, a personal digital assistant (PDA), a portable multimedia player (PMP), a digital camera, a music player, a portable game console, or a navigation device.

The metal structure 110 (or the cover 100 including the metal structure 110 may be disposed at one surface of the mobile device. For example, the metal structure 110 may be disposed at a back surface of the mobile device, which is opposite to a front surface of the mobile device where a display device is disposed. In some example embodiments, the cover 100 including the metal structure 110 may be detachably attached to a body housing of the mobile device. In other example embodiments, the cover 100 including the metal structure 110 may be integrally formed with the body housing of the mobile device.

The metal structure 110 of the cover 100 may include any metal material having a desired (or alternatively, predetermined) strength and a desired (or alternatively, predetermined) electrical conductivity. For example, the metal structure 110 may be formed of at least one of copper (Cu), aluminum (Al), iron (Fe), titanium (Ti), silver (Ag), palladium (Pd), platinum (Pt), aurum (Au), nickel (Ni) and the like. When the cover 100 of the mobile device is implemented as a metal cover formed mostly of the metal material, the cover 100 may become thinner while maintaining a desired (or alternatively, predetermined) strength. Accordingly, the mobile device may become thinner.

The metal structure 110 of the cover 100 may operate as an antenna for a wireless communication of the mobile device. In some example embodiments, the wireless communication of the mobile device may be a near field communication (NFC). In other example embodiments, the wireless communication of the mobile device may be any wireless communication, for example, a radio frequency identification (RFID) communication. In a conventional mobile device, a separate NFC antenna is attached to an inside of a cover of the conventional mobile device. However, the metal structure 110 or the cover 100 including the metal structure 110 according to example embodiments may serve as the NFC antenna by itself. Accordingly, by adopting the metal cover 100 including the metal structure 110 and serving as the NFC antenna, a relatively thin mobile device may be implemented. Further, if the metal cover is applied in a conventional mobile device, an NFC antenna attached to the metal cover may be shielded by the metal cover, and thus a signal (e.g., an electromagnetic wave) transmitted/received by the NFC antenna may be distorted. However, in the mobile device according to example embodiments, because the metal cover 100 operates as the NFC antenna by itself, the NFC communication may be accurately performed without a signal distortion.

In some example embodiments, to allow the metal structure 110 or the cover 100 including the metal structure 110 to operate as the antenna for the wireless communication, the metal structure 110 of the cover 100 may include a metal plate region 170 having a shape of a split ring resonator (SPR). The metal plate region 170 having the shape of the SPR may serve as an inductor by forming a signal path SP (e.g., a current path), and operate as a resonator along with a capacitor formed at the metal structure 110 or a capacitor formed at a matching circuit of the mobile device. To form the signal path SP at the metal plate region 170, the metal structure 110 may include a metal plate 120, an opening 130, a slit 140 and terminals 150 and 160.

The metal plate 120 may include the metal material, for example, copper (Cu), aluminum (Al), iron (Fe), titanium (Ti), silver (Ag), palladium (Pd), platinum (Pt), aurum (Au), or nickel (Ni). Thus, the metal plate 120 may have the electrical conductivity. The metal plate 120 may be disposed to cover one surface of the mobile device. For example, the metal plate 120 may be disposed at the back surface of the mobile device, which is opposite to the front surface of the mobile device where the display device is disposed.

The opening 130 may be formed at a portion of the metal plate 120. In some example embodiments, the opening 130 may be formed to expose a portion of components of the mobile device. For example, the opening 130 may be a camera hole that exposes a camera module of the mobile device. Although FIG. 1 illustrates an example where the opening 130 has a rectangular shape, in some example embodiments, the opening 130 may have any shape, for example, a triangular shape, a polygonal shape having five or more sides, a circular shape, or an elliptical shape.

The slit 140 may be formed at the metal plate 120, and may extend from the opening 130. For example, the slit 140 may extend from one side of the opening 130, and may be substantially perpendicular to the one side of the opening 130. The slit 140 may have a narrow width, for example a width narrower than that of the opening 130. In some example embodiments, a portion or the entirety of the slit 140 may be filled with an insulator or a dielectric. In this case, the insulator at the slit 140 may form a capacitor along with portions of the metal plate 120 at both sides of the slit 140.

A plurality of terminals 150 and 160 may be formed on the metal plate 120. For example, two terminals 150 and 160 may be disposed such that the slit 140 is located between the two terminals 150 and 160. The two terminals 150 and 160 may be coupled to a desired (or alternatively, predetermined) wireless communication chip (e.g., an NFC chip) through a matching circuit of the mobile device.

In the metal structure 110, a signal path SP (e.g., a current path) from one of the two terminals 150 and 160 to the other of the two terminals 150 and 160 may be formed at a region 170 of the metal plate 120 surrounding the opening 130. Accordingly, the region 170 of the metal plate 120, which may be a conductor having a split ring shape, may serve as an inductor having a desired (or alternatively, predetermined) inductance, and may operate as a resonator having a predetermined resonance frequency along with capacitors having desired (or alternatively, predetermined) capacitances included in the metal structure 110 and/or the matching circuit. In some example embodiments, a size of the opening 130 of the mobile device may be previously determined or may be set to have a desired value, and thus the inductance of the region 170 of the metal plate 120 may be fixed. In this case, the capacitances of the capacitors included in the metal structure 110 and/or the matching circuit may be adjusted to allow the resonance frequency of the resonator to become the same as a resonance frequency suitable for the wireless communication of the mobile device. For example, the mobile device may perform the NFC communication as the wireless communication, and the resonator formed by the region 170 of the metal plate 120 and the capacitor may have the resonance frequency of about 13.56 MHz. Accordingly, the metal structure 110 or the cover 100 including the metal structure 110 may operate as an antenna for the NFC communication.

As described above, the cover 100 of the mobile device according to example embodiments may serve as the inductor having the desired (or alternatively, predetermined) inductance or the resonator having the desired (or alternatively, predetermined) resonance frequency by including the region 170 of the metal plate 120 having the split ring shape, and thus may operate as the antenna for the wireless communication (e.g., the NFC communication) of the mobile device. That is, the cover 100 of the mobile device according to example embodiments may operate as the antenna for the NFC communication by itself, and thus the mobile device may not require a separate antenna for the NFC communication. Accordingly, although the cover 100 of the mobile device is the metal cover, the mobile device may accurately perform the NFC communication without the signal distortion. Further, because the separate antenna for the NFC communication is not required, the size of the mobile device may be reduced and a manufacturing cost may be reduced.

Figure 2A:
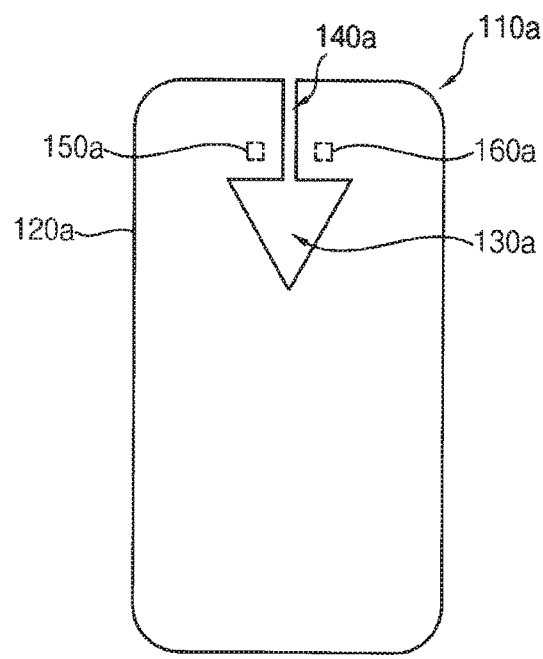
FIGS. 2A through 2C are diagrams illustrating some examples of openings formed at the cover of FIG. 1.
Figure 2B:
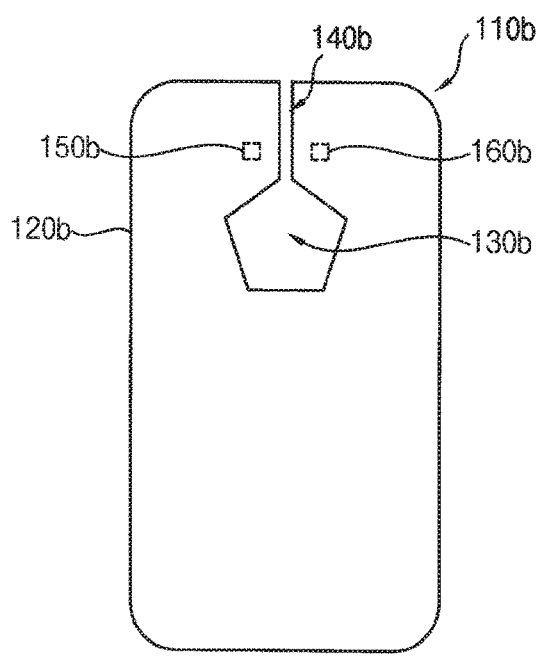
Figure 2C:
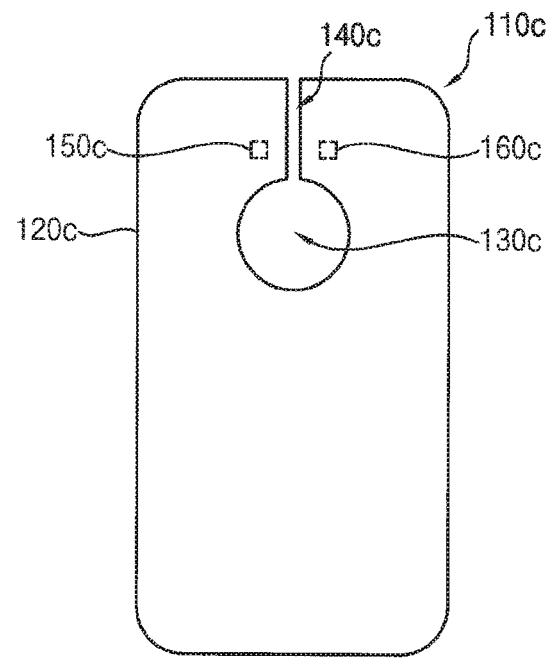

FIGS. 2A through 2C are diagrams illustrating some examples of openings formed at a cover of FIG. 1.

Referring to FIG. 2A, a metal structure 110a of a cover may include a metal plate 120a, an opening 130a, a slit 140a and terminals 150a and 160a. In some example embodiments, the opening 130a may expose a portion of components of the mobile device. For example, the opening 130a may be a camera hole that exposes a camera module of the mobile device. As illustrated in FIG. 2A, the opening 130a may have a triangular shape. A signal path from one terminal (e.g., 150a) to the other terminal (e.g., 160a) may be formed at a region of the metal plate 120a surrounding the opening 130a, and thus the metal structure 110a may operate as an antenna for a wireless communication.

Referring to FIG. 2B, a metal structure 110b of a cover may include a metal plate 120b, an opening 130b, a slit 140b and terminals 150b and 160b. The opening 130b may have any polygonal shape, for example, a pentagonal shape as illustrated in FIG. 2B. A signal path from one terminal (e.g., 150b) to the other terminal (e.g., 160b) may be formed at a region of the metal plate 120b surrounding the opening 130b, and thus the metal structure 110b may operate as an antenna for a wireless communication.

Referring to FIG. 2C, a metal structure 110c of a cover may include a metal plate 120c, an opening 130c, a slit 140c and terminals 150c and 160c. The opening 130c may have an elliptical shape, or a circular shape as illustrated in FIG. 2C. A signal path from one terminal (e.g., 150c) to the other terminal (e.g., 160c) may be formed at a region of the metal plate 120c surrounding the opening 130c, and thus the metal structure 110c may operate as an antenna for a wireless communication.

Figure 3:
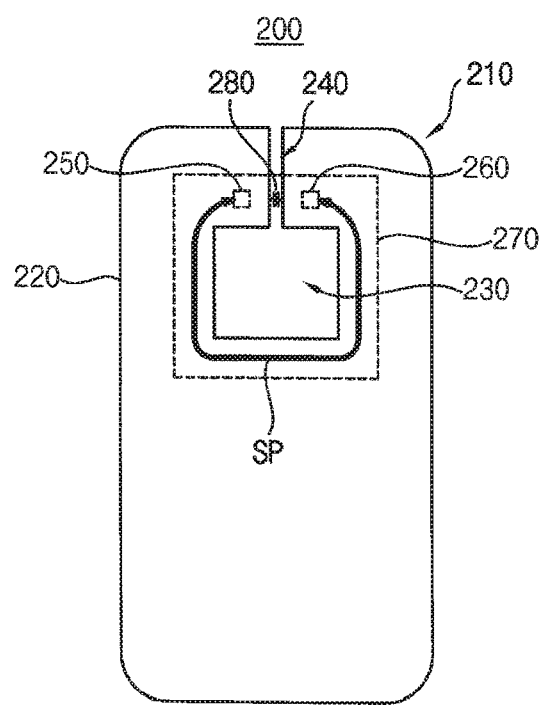
FIG. 3 is a diagram illustrating a cover of a mobile device according to example embodiments.
Figure 4:
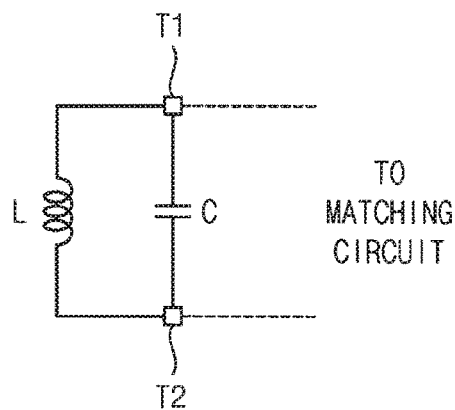
FIG. 4 is a circuit diagram illustrating an equivalent circuit of the cover of FIG. 3.

FIG. 3 is a diagram illustrating a cover of a mobile device according to example embodiments, and FIG. 4 is a circuit diagram illustrating an equivalent circuit of the cover of FIG. 3.

Referring to FIG. 3, a cover 200 of a mobile device may include a metal structure 210 formed of a metal material. The metal structure 210 may include a metal plate 220, an opening 230, a slit 240, terminals 250 and 260 and a capacitor 280. The metal structure 210 of FIG. 3 may have a similar configuration to the metal structure 110 of FIG. 1, except that the metal structure 210 may further include the capacitor 280.

The capacitor 280 may be formed at the slit 240 between the terminals 250 and 260. In some example embodiments, at least a portion of the slit 240 may be filled with an insulator, and the capacitor 280 may be formed by portion of the metal plate 220 at both side of the slit 240 and the insulator formed to fill the slit 240. In other example embodiments, a separately manufactured capacitor 280 may be attached to the silt 240.

The capacitor 280 may operate as a resonator along with a region 270 of the metal plate 220 at which a signal path SP is formed. For example, as illustrated in FIG. 4, the region 270 of the metal plate 220, which may be a conductor having a split ring shape, may serve as an inductor L having a desired (or alternatively, predetermined) inductance, and the capacitor 280 formed at the slit 240 may serve as a capacitor C coupled between terminals T1 and T2 (e.g., the terminals 250 and 260 illustrated in FIG. 3) and may be in parallel with the inductor L. Accordingly, the region 270 of the metal plate 220 and the capacitor 280 may operate as a resonator having a desired (or alternatively, predetermined) LC resonance frequency.

In some example embodiments, the capacitance of the capacitor 280 may be determined to allow the resonator to have a resonance frequency suitable for the wireless communication (e.g., an NFC communication) of the mobile device. For example, a size of the opening 230 may be determined according to a size of a component (e.g., a camera module) of the mobile device that is exposed by the opening 230, and thus the inductance of the region 270 of the metal plate 220 may be fixed. Thus, to allow the resonator to have the desired (or alternatively, predetermined) resonance frequency, the capacitance of the capacitor 280 may be determined based on the desired resonance frequency and the fixed inductance. For example, the mobile device may perform the NFC communication, and the capacitance of the capacitor 280 may be determined to allow the resonator to have a resonance frequency of, for example, about 13.56 MHz.

In other example embodiments, a matching circuit coupled to the terminals T1 and T2 (e.g., the terminals 250 and 260 illustrated in FIG. 3) may include a capacitor C between terminals T1 and T2, the capacitor C being in parallel with the inductor L, and the resonance frequency of the resonator may be determined based on the inductance of the inductor L (or the region 270 of the metal plate 220) and a sum of the capacitance of the capacitor C (or the capacitor 280) of the metal structure 210 and a capacitance of the capacitor of the matching circuit.

As described above, the cover 200 of the mobile device according to example embodiments may serve as the resonator having the desired (or alternatively, predetermined) resonance frequency by including the region 270 of the metal plate 220 serving as the inductor L and the capacitor 280 and C formed at the slit 240, thereby operating as the antenna for the wireless communication (e.g., the NFC communication) of the mobile device. For example, the cover 200 of the mobile device according to example embodiments may operate as the antenna for the NFC communication by itself, and thus the mobile device may not require a separate antenna for the NFC communication. Accordingly, although the cover 200 of the mobile device is the metal cover and the mobile device does not include a separate antenna for the NFC communication, the mobile device may accurately perform the NFC communication without the signal distortion. Further, because the separate antenna for the NFC communication is not required, the size of the mobile device may be reduced, and a manufacturing cost for the mobile device may be reduced.

Figure 5:
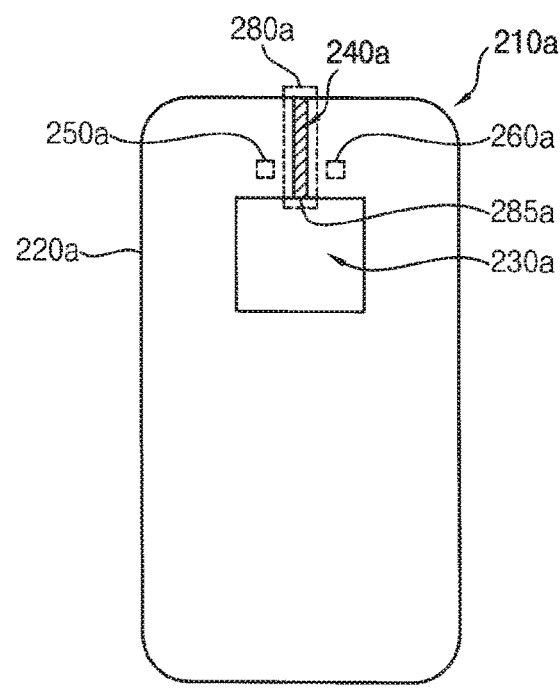
FIG. 5 is a diagram illustrating a modified example of the cover of FIG. 3.

FIG. 5 is a diagram illustrating a modified example of the cover of FIG. 3.

Referring to FIG. 5, a metal structure 210a of a cover may include a metal plate 220a, an opening 230a, a slit 240a, terminals 250a and 260a and a capacitor 280a formed at the slit 240a.

A portion or the entirety of the slit 240a may be filled with an insulator 285a. Thus, portions of the metal plate 220a at both side of the slit 240a and the insulator 285a may form the capacitor 280a.

Accordingly, the metal structure 210a may have a desired (or alternatively, predetermined) inductance by a region of the metal plate 220a at which a signal path is formed and a desired (or alternatively, predetermined) capacitance by the capacitor 280a. Thus, the metal structure 210a may operate as a resonator having a desired (or alternatively, predetermined) resonance frequency. Accordingly, the cover including the metal structure 210a may operate as an antenna by itself without a separate antenna.

Figure 6:
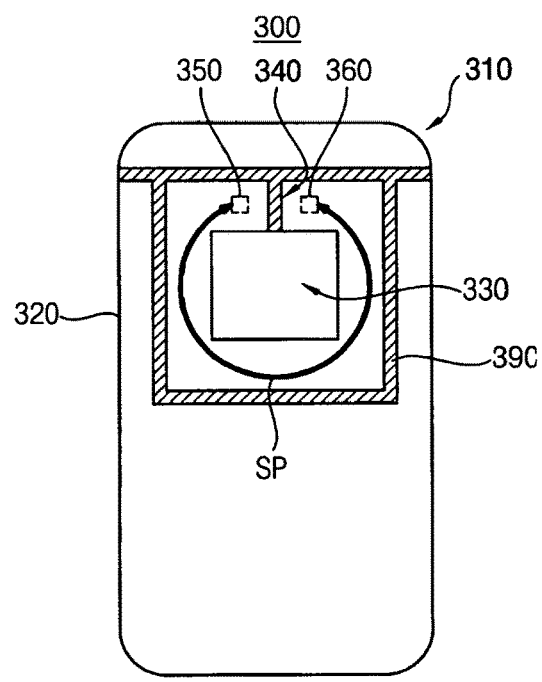
FIG. 6 is a diagram illustrating a cover of a mobile device according to example embodiments.

FIG. 6 is a diagram illustrating a cover of a mobile device according to example embodiments.

Referring to FIG. 6, a cover 300 of a mobile device may include a metal structure 310 formed of a metal material. The metal structure 310 may include a metal plate 320, an opening 330, a slit 340, terminals 350 and 360, and an insulator 390. The metal structure 310 of FIG. 6 may have a similar configuration to the metal structure 110 of FIG. 1, except that the metal structure 310 may further include the insulator 390.

The insulator 390 may be formed to surround a region of the metal plate 320 at which a signal path SP is formed. The signal path SP may be isolated by the insulator 390, and thus signal leakage (e.g., current leakage) of the signal path SP may be mitigated or prevented. Further, a noise from the outside of the signal path SP may be blocked by the insulator 390. Accordingly, a signal (e.g., an electromagnetic wave) transmitted/received by the cover 300 may be further mitigated or prevented from being distorted.

In some example embodiments, an insulator 390 (or a dielectric) may be further formed at the slit 340. In this case, the metal structure 310 may have a desired (or alternatively, predetermined) capacitance by portions of the metal plate 320 at both sides of the slit 340 and the insulator 390 (or the dielectric) formed to fill the slit 340. The metal structure 310 may further have a desired (or alternatively, predetermined) inductance by the region of the metal plate 320 at which the signal path SP is formed, and thus the metal structure 310 may operate as a resonator having a desired (or alternatively, predetermined) resonance frequency. Accordingly, the cover 300 of the mobile device according to example embodiments may operate as an antenna by itself without a separate antenna.

Figure 7:
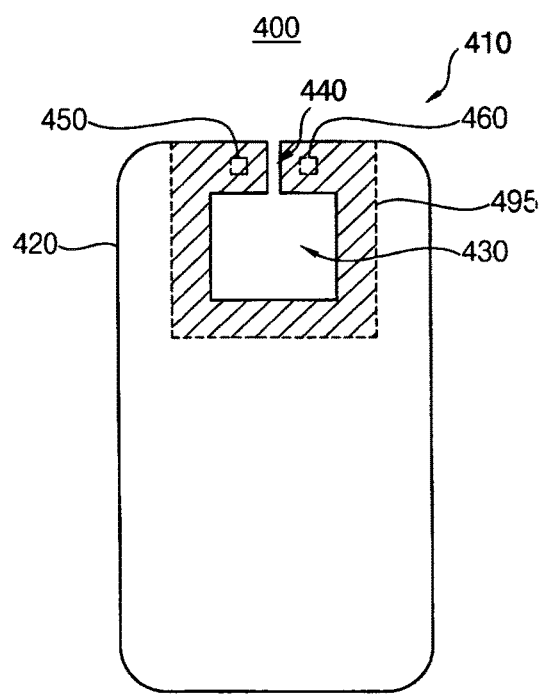
FIG. 7 is a diagram illustrating a cover of a mobile device according to example embodiments.

FIG. 7 is a diagram illustrating a cover of a mobile device according to example embodiments.

Referring to FIG. 7, a cover 400 of a mobile device may include a metal structure 410 formed of a metal material. The metal structure 410 may include a metal plate 420, an opening 430, a slit 440, terminals 450 and 460 and a magnetic sheet 495. The metal structure 410 of FIG. 7 may have a similar configuration to the metal structure 110 of FIG. 1, except that the metal structure 410 may further include the magnetic sheet 495.

The magnetic sheet 495 may be attached to at least a portion of the metal plate 420. In some example embodiments, the magnetic sheet 495 may be formed to cover the entire surface of the metal plate 420. In other example embodiments, the magnetic sheet 495 may be formed on a region of the metal plate 420 at which a signal path is formed. According to example embodiments, the magnetic sheet 495 may be a ferrite sheet or a magneto-dielectric material (MDM) sheet. The magnetic sheet 495 may improve electromagnetic wave radiation efficiency, and may adjust a resonance frequency of the metal structure 410. Accordingly, even if the region of the metal plate 420 at which the signal path is formed has a small size, the metal structure 410 may have a desired resonance frequency using the magnetic sheet 495. Thus, by the magnetic sheet 495, the size of the region of the metal plate 420 at which the signal path is formed may be reduced. Further, due to the reduction in size of the region of the metal plate 420 at which the signal path is formed, electromagnetic wave absorption by a human body may be reduced. For example, by the magnetic sheet 495, a change in the resonance frequency of the metal structure 410 when the cover 400 is touched by a hand of a human, which hereinafter will be referred to as a "hand effect," may be mitigated or prevented.

The cover 400 of the mobile device according to example embodiments may operate as an antenna by itself without a separate antenna. Further, in the cover 400 of the mobile device according to example embodiments, the hand effect may be mitigated or prevented by the magnetic sheet 495.

Figure 8:
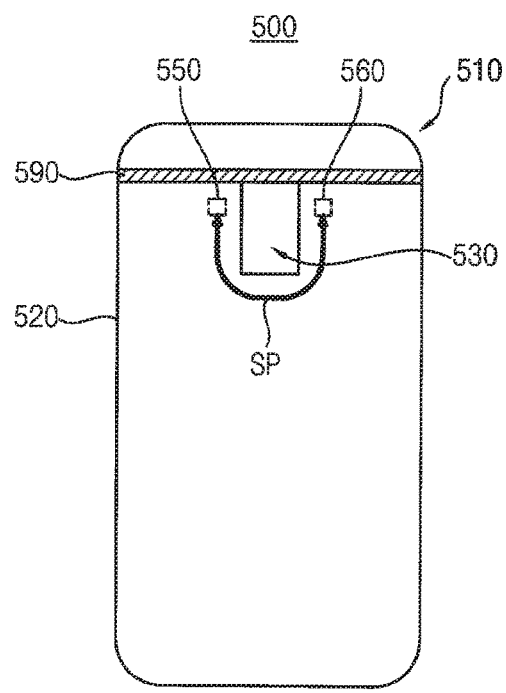
FIG. 8 is a diagram illustrating a cover of a mobile device according to example embodiments.

FIG. 8 is a diagram illustrating a cover of a mobile device according to example embodiments.

Referring to FIG. 8, a cover 500 of a mobile device includes a metal structure 510 formed of a metal material. The cover 500 may be disposed to cover one surface of the mobile device. The metal structure 510 of the cover 500 may include any metal material having a desired (or alternatively, predetermined) strength and a desired (or alternatively, predetermined) electrical conductivity. The metal structure 510 or the cover 500 including the metal structure 510 may operate as an antenna for a wireless communication (e.g., an NFC communication) of the mobile device.

To allow the cover 500 to operate as the antenna, the metal structure 510 may include a metal plate 520, an opening 530, and terminals 550 and 560.

The metal plate 520 may include the metal material, for example, copper (Cu), aluminum (Al), iron (Fe), titanium (Ti), silver (Ag), palladium (Pd), platinum (Pt), aurum (Au), or nickel (Ni). The opening 530 may be formed at a portion of the metal plate 520. In some example embodiments, the opening 530 may be formed to expose a portion of components (e.g., a camera module) of the mobile device. Although FIG. 8 illustrates an example where the opening 530 has a rectangular shape, in some example embodiments, the opening 530 may have any shape, for example, a triangular shape, a polygonal shape having five or more sides, a circular shape, or an elliptical shape. The two terminals 550 and 560 may be disposed on the metal plate 520 such that the opening 530 is located between the two terminals 550 and 560. In some example embodiments, the opening 530 may extend to an edge of the metal plate 520, and may be formed such that a portion of a top region of the metal plate 520 is opened. In this case, the two terminals 550 and 560 may be formed near the edge at the top region of the metal plate 520 while the opening 530 is located between the two terminals 550 and 560. In other example embodiments, as illustrated in FIG. 8, the metal structure 510 may further include an insulator 590 formed at one side of the opening 530, and the two terminals 550 and 560 may be formed near the insulator 590 while the opening 530 is located between the two terminals 550 and 560.

In the metal structure 510, a signal path SP (e.g., a current path) from one of the two terminals 550 and 560 to the other of the two terminals 550 and 560 may be formed at a region of the metal plate 520 surrounding the opening 530. Accordingly, the region of the metal plate 520 at which the signal path SP is formed may serve as an inductor having a desired (or alternatively, predetermined) inductance, and may operate as a resonator having a desired (or alternatively, predetermined) resonance frequency along with capacitors having desired (or alternatively, predetermined) capacitances included in the metal structure 510 and/or a matching circuit.

As described above, the cover 500 of the mobile device according to example embodiments may serve as the inductor having the desired (or alternatively, predetermined) inductance and/or the resonator having the desired (or alternatively, predetermined) resonance frequency. Thus, the cover 500 of the mobile device according to example embodiments may operate as the antenna for the wireless communication (e.g., the NFC communication) of the mobile device. For example, the cover 500 of the mobile device according to example embodiments may operate as the antenna for the NFC communication by itself, a separate provision of an antenna for the NFC communication of the mobile device may not be required. Accordingly, although the cover 500 of the mobile device is formed of the metal material, the mobile device may accurately perform the NFC communication without the signal distortion. Further, because the separate antenna for the NFC communication is not required, the size of the mobile device may be reduced, and a manufacturing cost may be reduced.

Figure 9:
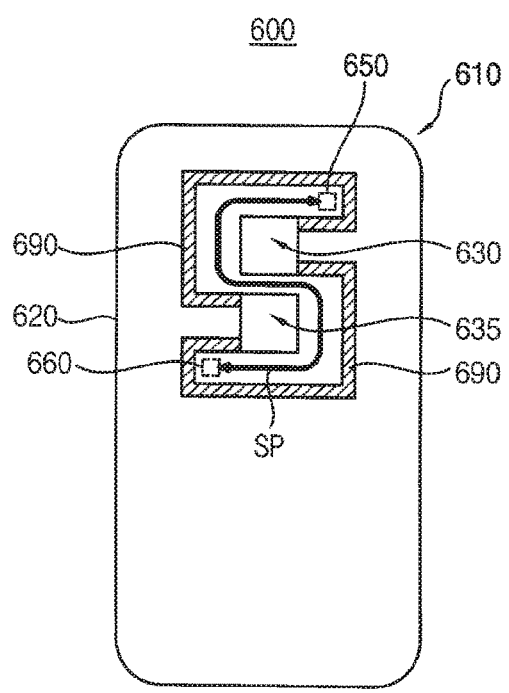
FIG. 9 is a diagram illustrating a cover of a mobile device according to example embodiments.

FIG. 9 is a diagram illustrating a cover of a mobile device according to example embodiments.

Referring to FIG. 9, a cover 600 of a mobile device includes a metal structure 610 formed of a metal material. The cover 600 may be disposed to cover one surface of the mobile device. The metal structure 610 of the cover 600 may include any metal material having a desired (or alternatively, predetermined) strength and a desired (or alternatively, predetermined) electrical conductivity. The metal structure 610 or the cover 600 including the metal structure 610 may operate as an antenna for a wireless communication (e.g., an NFC communication) of the mobile device.

To allow the cover 600 to operate as the antenna, the metal structure 610 may include a metal plate 620, a first opening 630, a second opening 635, terminals 650 and 660, and an insulator 690.

The metal plate 620 may include the metal material, for example, copper (Cu), aluminum (Al), iron (Fe), titanium (Ti), silver (Ag), palladium (Pd), platinum (Pt), aurum (Au), or nickel (Ni). The first opening 630 may be formed at a portion of the metal plate 620, and the second opening 635 may be formed at another portion of the metal plate 620. In some example embodiments, the first and second openings 630 and 635 may be formed to expose a portion of components of the mobile device. For example, a camera lens of the mobile device may be exposed through the first opening 630, and a camera flash may be exposed through the second opening 635. Although FIG. 9 illustrates an example where the first and second openings 630 and 635 have rectangular shapes, in some example embodiments, each opening 630 and 635 may have any shape, for example, a triangular shape, a polygonal shape having five or more sides, a circular shape, or an elliptical shape. The two terminals 650 and 660 may be disposed on the metal plate 620 such that the first and second openings 630 and 635 are located between the two terminals 650 and 660. For example, one terminal 650 may be disposed near the top right corner of the first opening 630, and the other terminal 660 may be disposed near the bottom left corner of the second opening 635.

In the metal structure 610, an S-shaped signal path SP may be formed at a region outside the first opening 630, a region between the first and second openings 630 and 635 and a region outside the second opening 635. For example, as illustrated in FIG. 9, the signal path SP may be formed at a region of the metal plate 620 near a top side of the first opening 630, a region of the metal plate 620 near a left side of the first opening 630, a region of the metal plate 620 between the first and second openings 630 and 635, a region of the metal plate 620 near a right side of the second opening 635 and a region of the metal plate 620 near a bottom side of the second opening 635. Further, the insulator 690 may be formed to surround the signal path SP. Accordingly, the regions of the metal plate 620 at which the signal path SP is formed may serve as an inductor having a desired (or alternatively, predetermined) inductance, and may operate as a resonator having a desired (or alternatively, predetermined) resonance frequency along with capacitors having desired (or alternatively, predetermined) capacitances included in the metal structure 610 and/or a matching circuit.

As described above, the cover 600 of the mobile device according to example embodiments may serve as the inductor having the desired (or alternatively, predetermined) inductance or the resonator having the desired (or alternatively, predetermined) resonance frequency, and thus may operate as the antenna for the wireless communication (e.g., the NFC communication) of the mobile device. For example, the cover 600 of the mobile device according to example embodiments may operate as the antenna for the NFC communication by itself, and thus the mobile device may not require a separate antenna for the NFC communication. Accordingly, although the cover 600 of the mobile device is formed of the metal material, the mobile device may accurately perform the NFC communication without the signal distortion. Further, because the separate antenna for the NFC communication is not required, the size of the mobile device may be reduced, and a manufacturing cost may be reduced.

Figure 10:
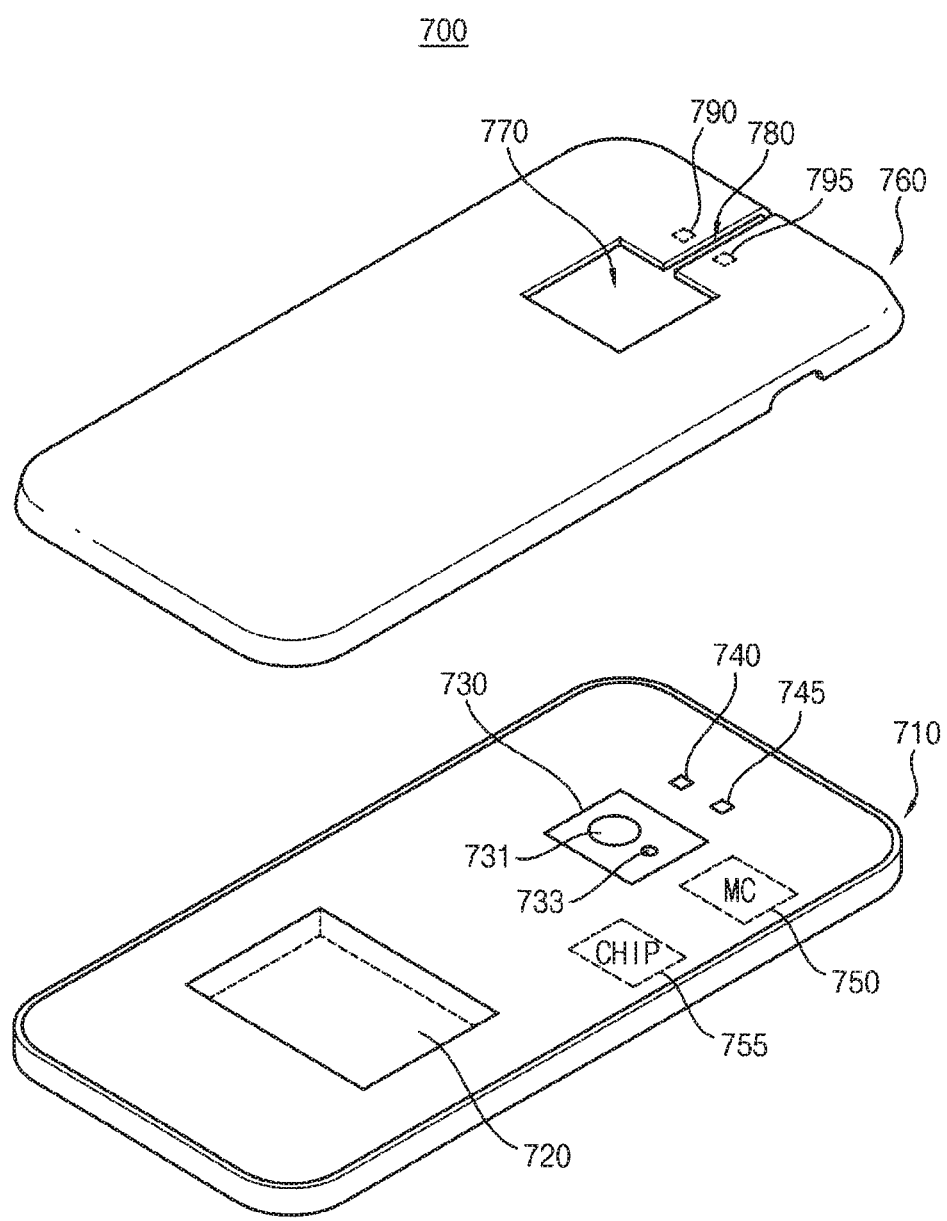
FIG. 10 is a diagram illustrating an example of a mobile device according to example embodiments.

FIG. 10 is a diagram illustrating an example of a mobile device according to example embodiments.

Referring to FIG. 10, a mobile device 700 may include a main body 710 and a cover 760. The cover 760 may be any one of the covers 100, 200, 300, 400, 500 and 600 illustrated in FIGS. 1 through 10. Although FIG. 10 illustrates a smart phone as an example of the mobile device 700, in some example embodiments, the mobile device 700 may be any mobile device, for example, a cellular phone, a tablet computer, a laptop computer, a personal digital assistant (PDA), a portable multimedia player (PMP), a digital camera, a music player, a portable game console, or a navigation device. Further, although FIG. 10 illustrates an example where the cover 760 is detachably attached to a housing of the main body 710, in some example embodiments, the cover 760 may be integrally formed with the housing of the main body 710.

The cover 760 may be disposed to cover one surface of the main body 710 of the mobile device 700. For example, the cover 760 may be disposed to cover a back surface of the main body 710 where a battery receiving groove 720 is formed.

An opening 770 may be formed at the cover 760. When the cover 760 is attached to the housing of the main body 710, a camera module 730 may be exposed through the opening 770. For example, a camera lens 731 and a camera flash 733 may be exposed through the opening 770.

A slit 780 may be formed at the cover 760, and the slit 780 may extend from the opening 770. Two terminals 790 and 795 may be formed an inner surface of the cover 760 facing the main body 710, and the two terminals 790 and 795 may be disposed such that the slit 780 is located between the two terminals 790 and 795. When the cover 760 is attached to the housing of the main body 710, the two terminals 790 and 795 may contact two pins 740 and 745 formed on the main body 710. Accordingly, a signal path formed at the cover 760 may be electrically coupled to a matching circuit 750 and a wireless communication chip 755 embedded in the main body 710. The wireless communication chip 755 may perform a wireless communication, and the matching circuit 750 may perform impedance matching between the wireless communication chip 755 and an antenna for the wireless communication.

The cover 760 may be implemented as a metal cover, and may operate as the antenna for the wireless communication performed by the wireless communication chip 755 by itself. For example, the wireless communication chip 755 may perform the wireless communication via the matching circuit 750 and the cover 760 without a separate antenna. In some example embodiments, the wireless communication chip 755 may be an NFC chip that performs an NFC communication. In other example embodiments, the wireless communication chip 755 may perform any wireless communication, for example, an RFID communication. In some example embodiments, the wireless communication chip 755 may be embedded in the main body 710 of the mobile device 700. In other example embodiments, the wireless communication chip 755 may be detachably attached to the main body 710 of the mobile device 700.

As described above, the mobile device 700 according to example embodiments may use the cover 760 as the antenna for the wireless communication without a separate antenna. Accordingly, because the separate antenna for the wireless communication is not required, the size of the mobile device 700 may be reduced, and a manufacturing cost may be reduced.

Figure 11:
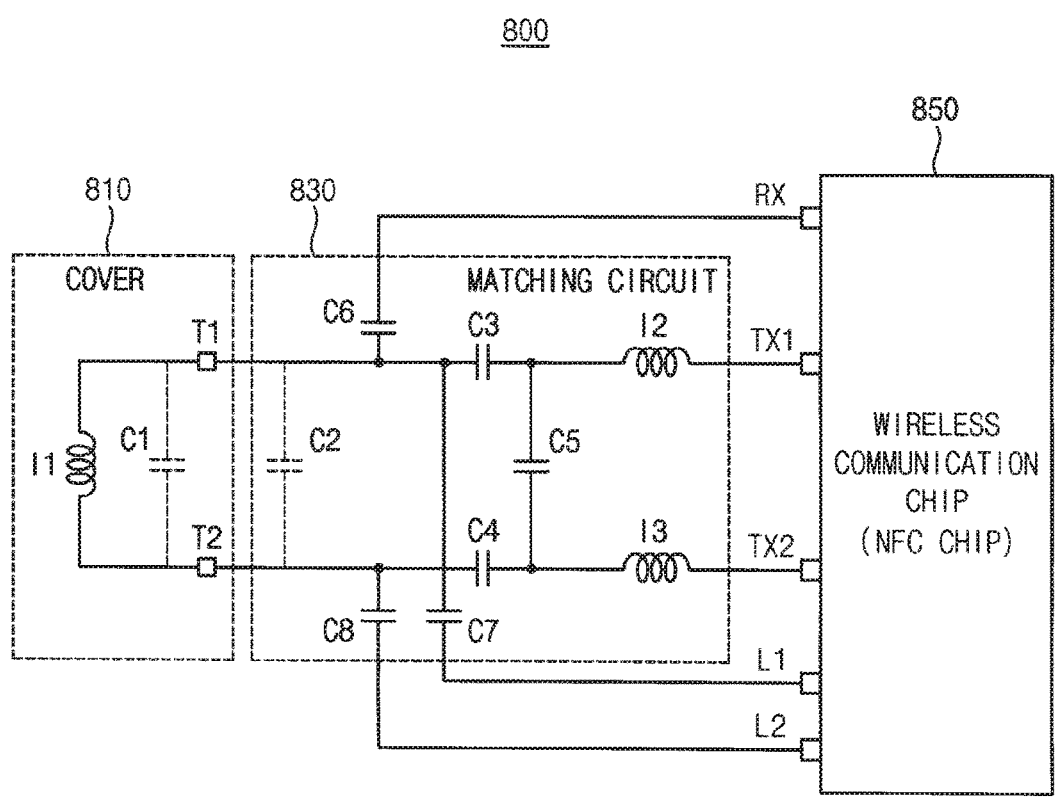
FIG. 11 is a circuit diagram illustrating a wireless communication device included in a mobile device according to example embodiments.

FIG. 11 is a circuit diagram illustrating a wireless communication device included in a mobile device according to example embodiments.

Referring to FIG. 11, a wireless communication device 800 included in a mobile device may include a cover 810 of the mobile device, a matching circuit 830 and a wireless communication chip 850. In some example embodiments, the wireless communication device 800 may be an NFC device, and the wireless communication chip 850 may be an NFC chip.

The cover 810 of the mobile device may be any one of covers 100, 200, 300, 400, 500 and 600 illustrated in FIGS. 1 through 9. The cover 810 may be implemented as a metal cover, and may operate as an antenna for a wireless communication by itself. In some example embodiments, the cover 810 may include a first inductor I1 having a desired (or alternatively, predetermined) inductance and a first capacitor C1 having a desired (or alternatively, predetermined) capacitance, and thus may operate as a resonator having a resonance frequency suitable for the wireless communication performed by the wireless communication chip 850. In some example embodiments, the matching circuit 830 may not include a second capacitor C2. In other example embodiments, the cover 810 may include the first inductor I1 having the desired (or alternatively, predetermined) inductance, and the matching circuit 830 may include the second capacitor C2 coupled between terminals T1 and T2 of the cover 810. In this case, the cover 810 may operate as the resonator having the resonance frequency suitable for the wireless communication along with the second capacitor C2 included in the matching circuit 830. In still other example embodiments, the cover 810 may include the first inductor I1 and the first capacitor C1, and the matching circuit 830 may include the second capacitor C2. In this case, the resonance frequency of the resonator implemented by the cover 810 may be determined based on the inductance of the first inductor I1 and a sum of the capacitance of the first capacitor C1 and the capacitance of the second capacitor C2.

The matching circuit 830 may be coupled to the terminals T1 and T2 of the cover 830, and may be coupled to terminals RX, TX1, TX2, L1 and L2 of the wireless communication chip 850. The matching circuit 830 may perform impedance matching between the wireless communication chip 850 and the antenna for the wireless communication, e.g., the cover 810.

In some example embodiments, the matching circuit 830 may include a third capacitor C3, a fourth capacitor C4, a fifth capacitor C5, a sixth capacitor C6, a seventh capacitor C7, an eighth capacitor C8, a second inductor I2 and a third inductor I3. The third capacitor C3 may be coupled between a first terminal T1 of the cover 810 and a first node, the fourth capacitor C4 may be coupled between a second terminal T2 of the cover 810 and a second node, and the fifth capacitor C5 may be coupled between the first node and the second node. The second inductor I2 may be coupled between the first node and a first transmitting terminal TX1 of the wireless communication chip 850, and the third inductor I3 may be coupled between the second node and a second transmitting terminal TX2 of the wireless communication chip 850. The sixth capacitor C6 may be coupled between the first terminal T1 of the cover 810 and a receiving terminal RX of the wireless communication chip 850. The seventh capacitor C7 may be coupled between the first terminal T1 of the cover 810 and a first power terminal L1 of the wireless communication chip 850, and the eighth capacitor C8 may be coupled between the second terminal T2 of the cover 810 and a second power terminal L2 of the wireless communication chip 850. Although FIG. 11 illustrates an example of a configuration of the matching circuit 830, the matching circuit 830 may have any configuration for impedance matching between the cover 810 and the wireless communication chip 850.

The wireless communication chip 850 may perform the wireless communication, for example the NFC communication, via the matching circuit 830 and the cover 810. The wireless communication chip 850 may be coupled to the matching circuit 830 through the first power terminal L1, the second power terminal L2, the first transmitting terminal TX1, the second transmitting terminal TX2 and the receiving terminal RX. In a case where the wireless communication chip 850 is the NFC chip, the wireless communication chip 850 may perform a transmitting/receiving operation through the first and second power terminals L1 and L2 in an NFC card mode. In an NFC reader mode, the wireless communication chip 850 may perform a transmitting operation through the first and second transmitting terminals TX1 and TX2, and may perform a receiving operation through the receiving terminal RX.

As described above, the wireless communication device 800 included in the mobile device according to example embodiments may use the cover 810 as the antenna for the wireless communication without a separate antenna. Accordingly, the size of the mobile device may be reduced, and a manufacturing cost may be reduced.

Figure 12:
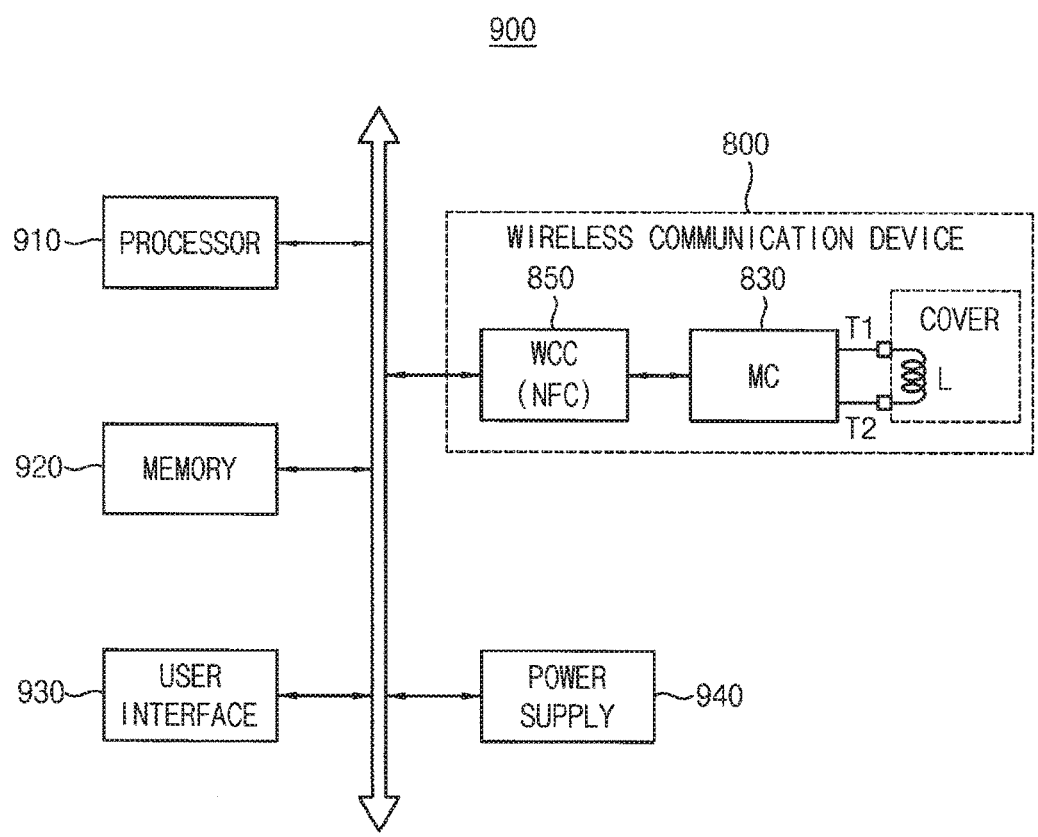
FIG. 12 is a block diagram illustrating a mobile device according to example embodiments.

FIG. 12 is a block diagram illustrating a mobile device according to example embodiments.

Referring to FIG. 12, a mobile device 900 may include a processor 910, a memory device 920, a user interface 930, a power supply 940, and a wireless communication device 800. According to example embodiments, the mobile device 900 may be any mobile device, for example, a cellular phone, a smart phone, a tablet computer, a laptop computer, a personal digital assistant (PDA), a portable multimedia player (PMP), a digital camera, a music player, a portable game console, or a navigation device.

The processor 910 may control an overall operation of the mobile device 910. In some example embodiments, the processor 910 may be an application processor (AP) that executes applications, for example, an internet browsing application, a game application, and/or a video player application. In some example embodiments, the processor 910 may be a single core processor. In other example embodiments, the processor 910 may be a multi-core processor including a plurality of processor cores. For example, the processor 910 may be, for example, a dual-core processor, a quad-core processor, or a hexa-core processor.

The memory device 920 may store data for an operation of the mobile device 900. For example, the memory device 920 may store a boot image for booting the mobile device 900, and may store data received from an external device. For example, the memory device 920 may be implemented as a volatile memory device, for example, a dynamic random access memory (DRAM), a static random access memory (SRAM), a mobile DRAM, a DDR SDRAM, an LPDDR SDRAM, a GDDER SDRAM, or an RDRAM, or may be implemented as a nonvolatile memory device, for example, an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM).

The wireless communication device 800 may perform a wireless communication with an external device. In some example embodiments, the wireless communication device 800 may be an NFC device that performs an NFC communication. The wireless communication device 800 may include a cover 810 of the mobile device 900 that is implemented as a metal cover. The cover 810 may operate as an antenna for the wireless communication. The wireless communication device 800 may further include a matching circuit 830 for impedance matching between the cover 810 and the matching circuit 830, and a wireless communication chip 850 that performs the wireless communication via the cover 810 and the matching circuit 830. The wireless communication device 800 included in the mobile device 900 according to example embodiments may use the cover 810 of the mobile device 900 as the antenna for the wireless communication without a separate antenna for the wireless communication. Accordingly, the size of the mobile device 900 may be reduced, and a manufacturing cost may be reduced.

The user interface 930 may include at least one input device, (e.g., a keyboard, a mouse, and/or a touch screen) and at least one output device (e.g., a printer or a display device). The power supply 940 may supply power to the mobile device 900.

In some example embodiments, the mobile device 900 may further include an image processor, and may further include a storage device (e.g., a memory card, a solid state drive (SSD), a hard disk drive (HDD), or a CD-ROM).

In some example embodiments, the mobile device 900 and/or components of the mobile device 900 may be packaged in various forms, for example, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

As described above, the cover 810 of the mobile device may be used as the antenna by itself. Accordingly, the size of the mobile device 900 may be reduced, and the manufacturing cost of the mobile device 900 may be reduced.

Example embodiments may be applied to any mobile device, for example, a cellular phone, a smart phone, a tablet computer, a laptop computer, a personal digital assistant (PDA), a portable multimedia player (PMP), a digital camera, a music player, a portable game console, or a navigation device.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A mobile device comprising:
a wireless communication chip configured to perform a wireless communication;
a matching circuit coupled to the wireless communication chip; and
a cover including,
a plate configured to cover at least one surface of the mobile device, and including a slit and an opening,
two terminals directly on the plate, the two terminals directly connected to the matching circuit, and
an insulating pattern dividing the plate into an inner region and an outer region surrounding the inner region, the insulating pattern surrounding the inner region of the plate at which a signal path from one of the two terminals to the other of the two terminals is formed,
wherein the slit is located between the two terminals, and extends from the opening,
at least a portion of the cover is configured to operate as an antenna for the wireless communication of the mobile device, and
the matching circuit is configured to perform an impedance matching between the wireless communication chip and the antenna for the wireless communication.

2. The mobile device of claim 1, wherein
the insulating pattern further divides the outer region of the plate into a first portion and a second portion, the first portion being at a top portion of the plate, the second portion being at a bottom portion of the plate, and
the inner region of the plate includes the opening.

3. The mobile device of claim 2, wherein the at least a portion of the cover includes the inner region.

4. The mobile device of claim 2, wherein the slit extends from the opening toward to at least one of the first portion or the second portion.

5. The mobile device of claim 1, wherein the plate includes metal material.

6. The mobile device of claim 1, wherein the antenna operates for a near field communication (NFC).

7. The mobile device of claim 1, wherein the mobile device does not include a separate antenna for the wireless communication.

8. A mobile device comprising:
a wireless communication chip configured to perform a wireless communication;
a matching circuit coupled to the wireless communication chip;
a cover including a plate configured to cover at least one surface of the mobile device, and two terminals directly on the plate, the plate including an opening and a slit, the two terminals directly connected to the matching circuit; and
an insulating pattern dividing the plate into an inner region and an outer region surrounding the inner region, the insulating pattern surrounding the inner region of the plate at which a signal path from one of the two terminals to the other of the two terminals is formed,
wherein the insulating pattern further divides the outer region of the plate into a first portion and a second portion,
the slit is between the two terminals, and extends from the opening toward one of the inner region or the first portion of the outer region,
the inner region of the plate is configured to operate as an antenna for the wireless communication of the mobile device, and
the matching circuit is configured to perform an impedance matching between the wireless communication chip and the antenna for the wireless communication.

9. The mobile device of claim 8, wherein
the first portion is at a top portion of the plate,
the second portion is at a bottom portion of the plate.

10. The mobile device of claim 8, wherein the plate includes metal material.

11. The mobile device of claim 8, wherein the plate includes a capacitor at the slit.

12. The mobile device of claim 8, wherein the opening has a triangular shape, a rectangular shape, a polygonal shape, a circular shape, or an elliptical shape.

13. The mobile device of claim 8, wherein the mobile device does not include a separate antenna for the wireless communication.

14. A mobile device comprising:
a wireless communication chip configured to perform a wireless communication;
a matching circuit coupled to the wireless communication chip; and
a cover including,
a plate configured to cover at least one surface of the mobile device and including an opening and a slit,
two terminals directly on the plate, the two terminals directly connected to the matching circuit, and
an insulating pattern dividing the plate into an inner region and an outer region surrounding the inner region, the insulating pattern surrounding the inner region of the plate at which a signal path from one of the two terminals to the other of the two terminals is formed,
wherein the insulating pattern further divides the outer region of the plate into a first portion and a second portion, the first portion being at a top portion of the plate, the second portion being at a bottom portion of the plate,
the slit is between the two terminals, and extends from the opening,
the inner region of the plate is configured to operate as an antenna for the wireless communication, and
the wireless communication chip is configured to perform the wireless communication via the matching circuit and the cover.

15. The mobile device of claim 14, wherein the two terminals are coupled to a capacitor included in the matching circuit.

16. The mobile device of claim 14, wherein the mobile device does not include a separate antenna for the wireless communication.

17. The mobile device of claim 14, wherein the plate includes metal material.

18. The mobile device of claim 14, wherein the inner region surrounds the opening.

* * * * *